United States Patent
McClean

Patent Number: 6,002,115
Date of Patent: Dec. 14, 1999

[54] CONTROL DEVICE FOR ELECTRIC HEATING APPARATUS

[75] Inventor: John William McClean, Sydney, Australia

[73] Assignee: Breville Pty., Ltd., Botany, Australia

[21] Appl. No.: 09/137,486

[22] Filed: Aug. 20, 1998

[30] Foreign Application Priority Data

Sep. 24, 1997 [AU] Australia .................................. PO9417

[51] Int. Cl.⁶ ...................................................... H05B 1/02
[52] U.S. Cl. .......................... 219/512; 219/508; 219/492; 219/450; 99/332
[58] Field of Search ..................................... 217/450–452, 217/508–512, 497, 492, 710, 494, 506; 99/332, 403, 426, 450, 335

[56] References Cited

U.S. PATENT DOCUMENTS

| 4,045,640 | 8/1977 | McQueen, Jr. et al. ................. 219/710 |
| 4,307,287 | 12/1981 | Weiss . |
| 4,349,726 | 9/1982 | Gossler .................................... 219/511 |
| 4,745,262 | 5/1988 | Larsen . |
| 4,982,656 | 1/1991 | Stone ....................................... 219/450 |
| 5,679,724 | 10/1997 | Mahood ................................... 219/508 |

*Primary Examiner*—Mark Paschall
*Attorney, Agent, or Firm*—Baker & Botts, L.L.P.

[57] ABSTRACT

A temperature controller for an electrically operated cooking appliance which performs as a thermostatic controller at high temperatures and as a simmerstat or time dependent temperature controller at simmering temperatures.

6 Claims, 2 Drawing Sheets

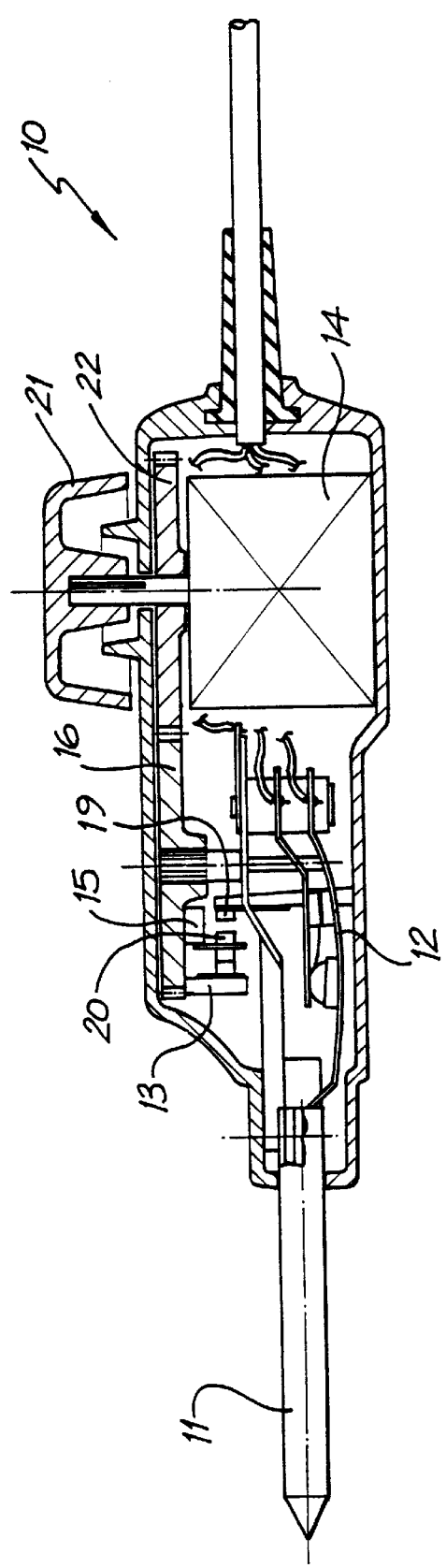
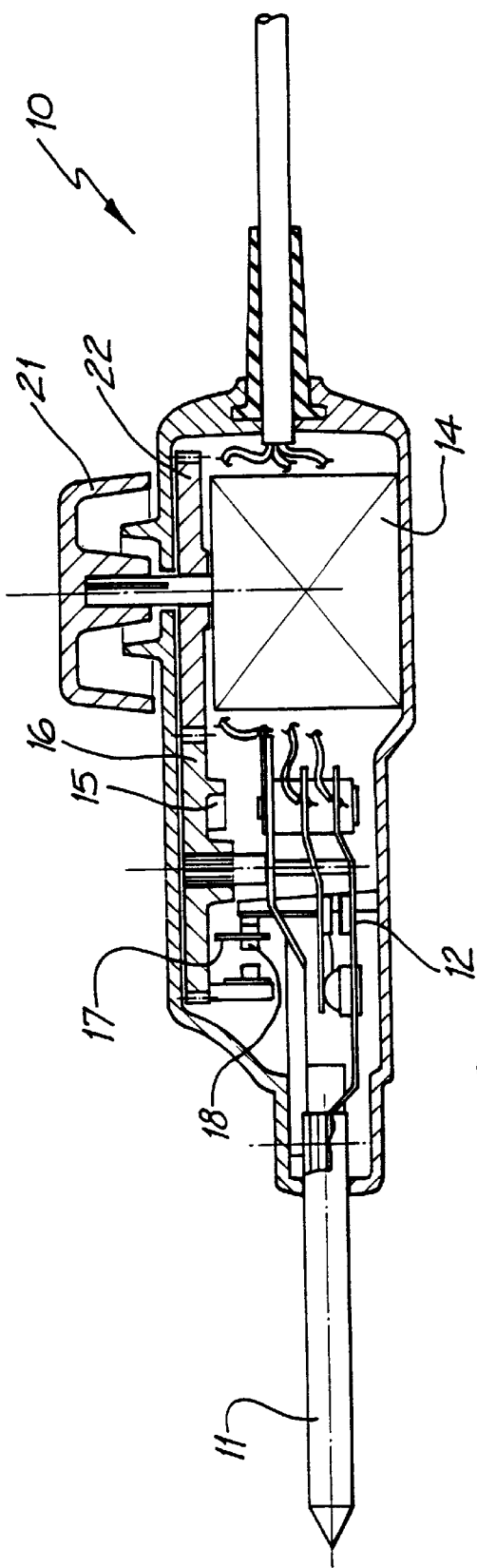

CONTROL DEVICE FOR ELECTRIC HEATING APPARATUS

The present invention relates to temperature controllers and more particularly to a method and means for controlling the operating temperature of a cooking appliance such as an electric frying pan or similar.

In existing cooking appliances such as electrically powered frypans, there is employed a temperature limiting probe which functions well for high temperature cooking in that when a cold food product is placed on a cooking surface controlled by a probe, the switch controlling electrical power to the cooking element remains closed circuited while ever the temperature is below a preset temperature. In the situation where a probe controlled cooking appliance is set at a low or simmer temperature the power to the cooking element is sequentially switched on and off between maximum power when on, to zero power when off. Such control, means that the cooking appliance fluctuates between a violent boiling action or power off. On average the temperature may approximate a simmer but only as a result of averaging between well above simmer maximums and well below simmer minimum temperatures.

At lower temperatures of operation, such as for simmer heating elements, a device known as a simmerstat has been used which switches between power on and power off in evenly timed periods, thereby providing an even slow cooking operation. The on and off switching of a simmerstat functions on a timed basis and not on a temperature basis. That form of temperature controlling function is entirely unsatisfactory for the searing of meats as they would merely stew under the action of the simmerstat were a simmerstat to be used as the temperature controlling device at the high temperature end of operation of the appliance.

The aim of the present invention is to provide a temperature controller wherein high temperature operation of a cooking appliance, such as a fry pan is maintained while desirable low or simmer temperature operation is also achievable.

In one aspect the present invention provides a temperature controller for an electric frying pan or the like, said controller including a temperature limiting probe adapted to control the maximum temperature of a heating element of the appliance in combination with a varyingly settable temperature limiter, a time dependent temperature limiter adapted to control the switching of power to the appliance between open and closed circuit conditions in a timed sequence, and switching means adapted to switch between the probe controlled heating and the time dependent temperature limiter at a temperature of operation of the appliance between maximum and minimum temperatures of operation of the appliance, and wherein the probe and settable temperature limiter control power switching to the heating element at a temperature above the predetermined temperature while the time dependent temperature limiter controls the supply of power to the heating element at temperatures below the predetermined temperature.

In a first embodiment the switching means functions in dependence upon the manual positioning of a temperature setting indicator.

In a second embodiment the indicator of the first embodiment is a rotable control knob directly coupled to the time dependent temperature limitor and indirectly coupled to said switching means.

A third embodiment of the invention has a switching means which includes a two position switch biased into a first contact position by spring means and movable into its second position via contact with a nib mounted for movement in correspondence with movement of a temperature setting indicator.

The present invention will now be described by way of example with reference to the accompanying drawings, in which:

FIG. 1 is a longitudinal cross section through one embodiment of the temperature control of the present invention when set for high temperature operation;

FIG. 2 is the same view as FIG. 1 but with the controller set for low temperature operation.

Figure 3:
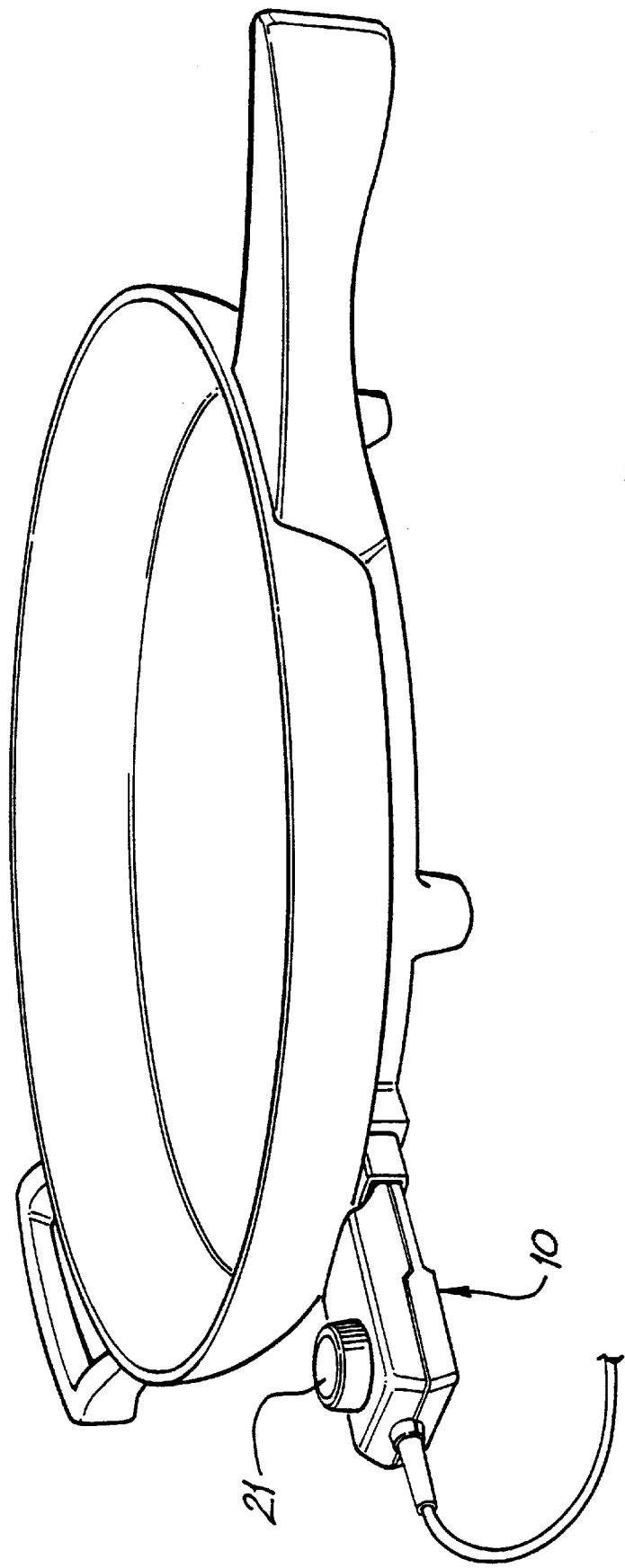
FIG. 3 is a perspective view of an electric frypan fitted with an energy controller of FIGS. 1 and 2.

The temperature controller 10 as shown in the drawings comprises a probe 11 conducting temperature detected by it to a snap action thermostat 12.

An energy controller 13 adapted to switch power control between probe 11 and thermostat 12 on the one hand and low temperature controller or simmerstat 14 on the other. The switching between high and low temperature controllers 11, 12 and 14, respectively, by controller 13 is achieved in the depicted embodiment by nib 15 on rotatable (gear wheel) 16 being brought into contact with leaf 17 to force electrical control 18 against bias of the leaf 17 toward its position in FIG. 1. Once nib 15 is rotatably moved out of contact with leaf 17 contacts 19, 20 meet to place simmerstat 14 in circuit.

Rotation of disc 16 being achieved by rotating control knob 21 which in turn rotates gear wheel 22 and hence meshed gear wheel 16.

In this embodiment the probe 11 and thermostat 12 control operation of an appliance between 120° C. and 270° C. while simmerstat 14 is adapted control temperatures in the range 65–120° C. The probe/thermostat combination 11, 12 functions on detected temperature whereas simmerstat 14 functions on a predetermined timing interval basis for power on and power off.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A temperature controller for controlling the cooking temperature of an electric cooking appliance, said appliance including a heating element and means to select the cooking temperature, said controller comprising a temperature sensitive probe in combination with a varyingly settable temperature limiter which together are adapted to control the switching of power to the element between open and closed circuit conditions in dependance on a set temperature, a time dependent temperature limiter adapted to cycle the switching of power to the heating element between open and closed circuit conditions in a timed sequence, and switching means for switching the probe and settable temperature limiter to control power switching to the heating element when cooking is selected to be at a temperature above a predetermined temperature, and to switch the time dependent temperature limiter to the heating element when cooking is selected to be at temperatures below the predetermined temperature.

2. A temperature controller as claimed in claim 1 wherein the switching means functions in dependence upon the manual positioning of a temperature setting indicator.

3. A temperature controller as claimed in claim 2 wherein the indicator is a rotable control knob directly coupled to the time dependent temperature limiter and indirectly coupled to said switching means.

4. A temperature controller as claimed in claim 2 or 3 wherein said switching means includes a two position switch biased into a first contact position by spring means and movable into it second position via contact with a nib mounted for movement in correspondence with movement of the indicator.

5. A temperature controller as claimed claim 1 or 2 wherein the predetermined temperature is approximately 120° C.

6. A temperature controller as claimed in claim 1 or 2 wherein the maximum temperature of the heating element is 270° C. and the minimum temperature of operation is 65° C.

\* \* \* \* \*